United States Patent Office 3,647,817
Patented Mar. 7, 1972

3,647,817
REARRANGEMENT PROCESS FOR PREPARATION OF ALKYL 2 - BENZIMIDAZOLECARBAMATES FROM ALKYL 2 - AMINOBENZIMIDAZOLE-1-CARBOXYLATES
Bruce I. Dittmar, Wilmington, Del., assignor to E. I. du Pont de Nemours and Company, Wilmington, Del.
No Drawing. Filed Jan. 14, 1969, Ser. No. 791,181
Int. Cl. C07d 49/38
U.S. Cl. 260—309.2
4 Claims

ABSTRACT OF THE DISCLOSURE

Alkyl 2 - aminobenzimidazole-1-carboxylates undergo a thermal rearrangement to the corresponding alkyl 2-benzimidazolecarbamate at temperatures between 110° C. and the melting point of the carbamate. The heating can be conducted in an inert solvent or without solvent.

The resulting alkyl 2-benzimidazolecarbamates are useful as fungicides and intermediates in the preparation of dialkyl esters of 2-carboxyaminobenzimidazole-1-carboxylic acids, which compounds are also fungicides.

SUMMARY OF THE INVENTION

It has been discovered that a group of alkyl 2-aminobenzimidazole-1-carboxylates, Formula I below, can be made to undergo a thermal rearrangement to the corresponding alkyl 2-benzimidazolecarbamates, Formula II, by heating them within a temperature range of 110° C. to the melting point of compound II, preferably not above the melting point of compound I. This thermal rearrangement is represented by the following equation:

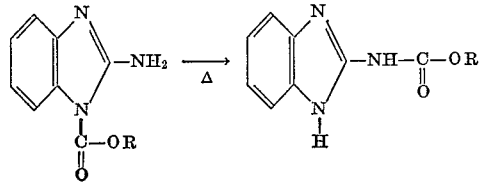

wherein: R is methyl, ethyl or isopropyl.

DETAILED DESCRIPTION OF THE INVENTION

The alkyl 2-benzimidazolecarbamates of Formula II above are useful as fungicides and are also useful as intermediates in the preparation of dialkyl esters of 2-carboxyaminobenzimidazole-1-carboxylic acids as set forth in U.S. Pat. 2,933,504.

When the attempt is made to prepare alkyl 2-benzimidazolecarbamates by reacting 2-aminobenzimidazole with an alkyl chloroformate and an acid acceptor, instead of the desired product, an alkyl 2-aminobenzimidazole-1-carboxylate is the primary product formed. This reaction is illustrated by the following equation:

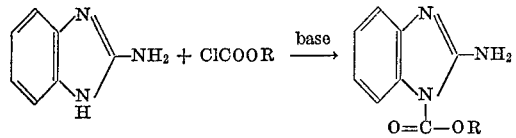

where R is as previously defined.

According to the present invention, the alkyl 2-aminobenzimidazole-1-carboxylate thus produced can be thermally rearranged to the desired alkyl 2-benzimidazolecarbamate by heating it within a certain range of temperatures.

This rearrangement of the compounds of Formula I to compounds of Formula II can be effected by the application of heat under appropriate conditions, e.g. (a) melting the compound of Formula I and holding the temperature between the melting point of the compound of Formula I and about 200° C., preferably at the melting point of Formula I; or (b) heating the compound of Formula I in an inert solvent, such as anisole, cumene, diphenyl ether or nitrobenzene, at a temperature of about 110–220° C. The rapidity and completeness of the rearrangement reaction depends on the nature of the R group and the temperature. A period of time of ½ to 5 hours is generally sufficient if the rearrangement is conducted in a solvent at about 150° C. or without solvent, i.e. as a melt. Lower temperatures necessitate longer reaction times. Higher temperatures lower the required reaction time may lead to undesired side reactions.

In order to illustrate some suitable preparative conditions, the following examples are given. All parts are parts by weight unless otherwise indicated.

Example 1

A mixture of 4 parts of methyl 2-aminobenzimidazole-1-carboxylate and 100 parts of cumene is refluxed for 5 hours. The reaction mixture is cooled to 25° C. and 2.7 parts of methyl 2-benzimidazolecarbamate is collected by filtration.

Using the procedure described above, the following alkyl 2 - aminobenzimidazole - 1 - carboxylates are rearranged to the corresponding alkyl 2-benzimidazolecarbamates.

ethyl 2-aminobenzimidazole-1-carboxylate rearranges to ethyl 2-benzimidazolecarbamate
isopropyl 2-aminobenzimidazole-1-carboxylate rearranges to isopropyl 2-benzimidazolecarbamate.

Example 2

Ten parts of isopropyl 2-aminobenzimidazole-1-carboxylate in 100 parts of anisole is refluxed for 1 hour. The reaction is cooled to 25° C. and isopropyl 2-benzimidazole-carbamate is collected by filtration.

Example 3

Ten parts of methyl 2-aminobenzimidazole-1-carboxylate is heated neat with careful stirring at the melting point (about 160° C.) for 5 hours. The reaction material is cooled, slurried in acetone, and methyl 2-benzimidazolecarbamate is collected by filtration.

What is claimed is:
1. A thermal rearrangement process for making an alkyl 2-benzimidazolecarbamate of the formula:

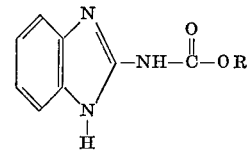

where R is methyl, ethyl or isopropyl,
comprising melting an alkyl 2-aminobenzimidazole-1-carboxylate of the formula:

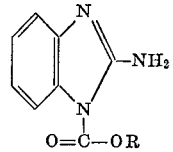

wherein R is as previously defined and holding the temperature between the melting point and about 200° C. for a period of time to form said alkyl 2-benzimidazolecarbamate.

2. The process of claim 1 wherein R is methyl.

3. A thermal rearrangement process for making an alkyl 2-benzimidazolecarbamate of the formula:

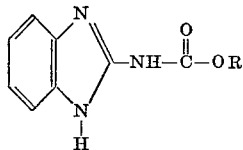

where R is methyl, ethyl or isopropyl, comprising heating an alkyl 2-aminobenzimidazole-1-carboxylate of the formula:

wherein R is as previously defined, to a temperature between 110° C. and 220° C. in an inert solvent for a period of time to form said alkyl 2-bezimidazolecarbamate.

4. The process of claim 3 wherein R is methyl.

References Cited

UNITED STATES PATENTS 3,480,642  11/1969  Stedman _____ 260—309.2

OTHER REFERENCES

The Merck Index, 7th Ed. pp. 83 and 802, Rahway, N.J., Merck, 1960, RS356.M524.

Scheflan et al., The Handbook of Solvents, pp. 230, 231, 556, and 557 New York, Van Nostrand, 1953, TP247.S32.

NATALIE TROUSOF, Primary Examiner

U.S. Cl. X.R.

260—999